(12) United States Patent
Yeh et al.

(10) Patent No.: US 7,534,010 B2
(45) Date of Patent: May 19, 2009

(54) BACKLIGHT MODULE

(75) Inventors: Ke-Ming Yeh, Taipei County (TW);
Chih-Chun Hsiao, Kaohsiung County (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 0 days.

(21) Appl. No.: 11/617,378

(22) Filed: Dec. 28, 2006

(65) Prior Publication Data

US 2008/0158908 A1 Jul. 3, 2008

(51) Int. Cl.
*F21V 7/00* (2006.01)
(52) U.S. Cl. .................. 362/241; 362/609; 362/613; 362/240; 362/237
(58) Field of Classification Search ......... 362/608–609, 362/611–612, 237, 240, 241, 613, 347, 350, 362/296, 306, 310, 341, 516, 519, 27, 346; 349/67
See application file for complete search history.

(56) References Cited

U.S. PATENT DOCUMENTS

| | | | | |
|---|---|---|---|---|
| 5,961,198 A * | 10/1999 | Hira et al. | | 362/621 |
| 6,368,945 B1 | 4/2002 | Im | | |
| 6,820,992 B2 | 11/2004 | Yu et al. | | |
| 6,969,188 B2 | 11/2005 | Kuo | | |
| 7,303,324 B2 * | 12/2007 | Yang et al. | | 362/609 |
| 7,350,952 B2 * | 4/2008 | Nishigaki | | 362/602 |
| 2002/0006040 A1 * | 1/2002 | Kamada et al. | | 362/237 |
| 2003/0072146 A1 | 4/2003 | Yu et al. | | |
| 2004/0130884 A1 * | 7/2004 | Yoo et al. | | 362/31 |
| 2005/0243243 A1 | 11/2005 | Koganezawa | | |
| 2005/0243576 A1 | 11/2005 | Park et al. | | |
| 2005/0276066 A1 | 12/2005 | Kim et al. | | |
| 2006/0007702 A1 | 1/2006 | Hsieh et al. | | |
| 2006/0215075 A1 * | 9/2006 | Huang et al. | | 349/67 |
| 2006/0221636 A1 * | 10/2006 | Ohashi et al. | | 362/612 |
| 2006/0291244 A1 * | 12/2006 | Yang et al. | | 362/609 |
| 2007/0070625 A1 * | 3/2007 | Bang | | 362/240 |
| 2007/0147075 A1 * | 6/2007 | Bang | | 362/609 |

FOREIGN PATENT DOCUMENTS

| | | |
|---|---|---|
| CN | 1702523 | 11/2005 |
| JP | 2002-175031 | 6/2002 |
| JP | 2005-183124 | 7/2005 |
| KR | 10-2006-0048662 | 5/2006 |
| TW | 595689 | 6/2004 |
| TW | 200408890 | 6/2004 |
| TW | 2005/01447 | 1/2005 |
| TW | 1247176 | 1/2006 |

* cited by examiner

*Primary Examiner*—Jacob Y Choi
*Assistant Examiner*—Robert May
(74) *Attorney, Agent, or Firm*—J.C. Patents (57) ABSTRACT

A backlight module includes a light guide plate, a plurality of reflectors and a plurality of point light sources is provided. The light guide plate has a light emitting surface, a bottom surface and a light incident surface connecting the light emitting surface and the bottom surface. The plurality of reflectors is disposed beside the light incident surface, and the point light sources are disposed on the inner walls of the reflectors.

25 Claims, 6 Drawing Sheets

BACKLIGHT MODULE

BACKGROUND OF THE INVENTION

1. Field of Invention

The present invention relates to a light source module, and more particularly to a backlight module.

2. Description of Related Art

Recently, backlight modules of liquid crystal displays adopt light-emitting diodes (LEDs) having long service life, high efficiency and low environmental pollution as point light sources. White light LEDs were used as point light sources, which may cause poor color saturation. Later, a backlight module architecture with mixing the red, blue and green lights of LEDs into a white light is adopted to solve the aforementioned problem. However, a long light-mixing distance is necessary to uniformly mix the red, blue and green lights into a white light.

Figure 1:
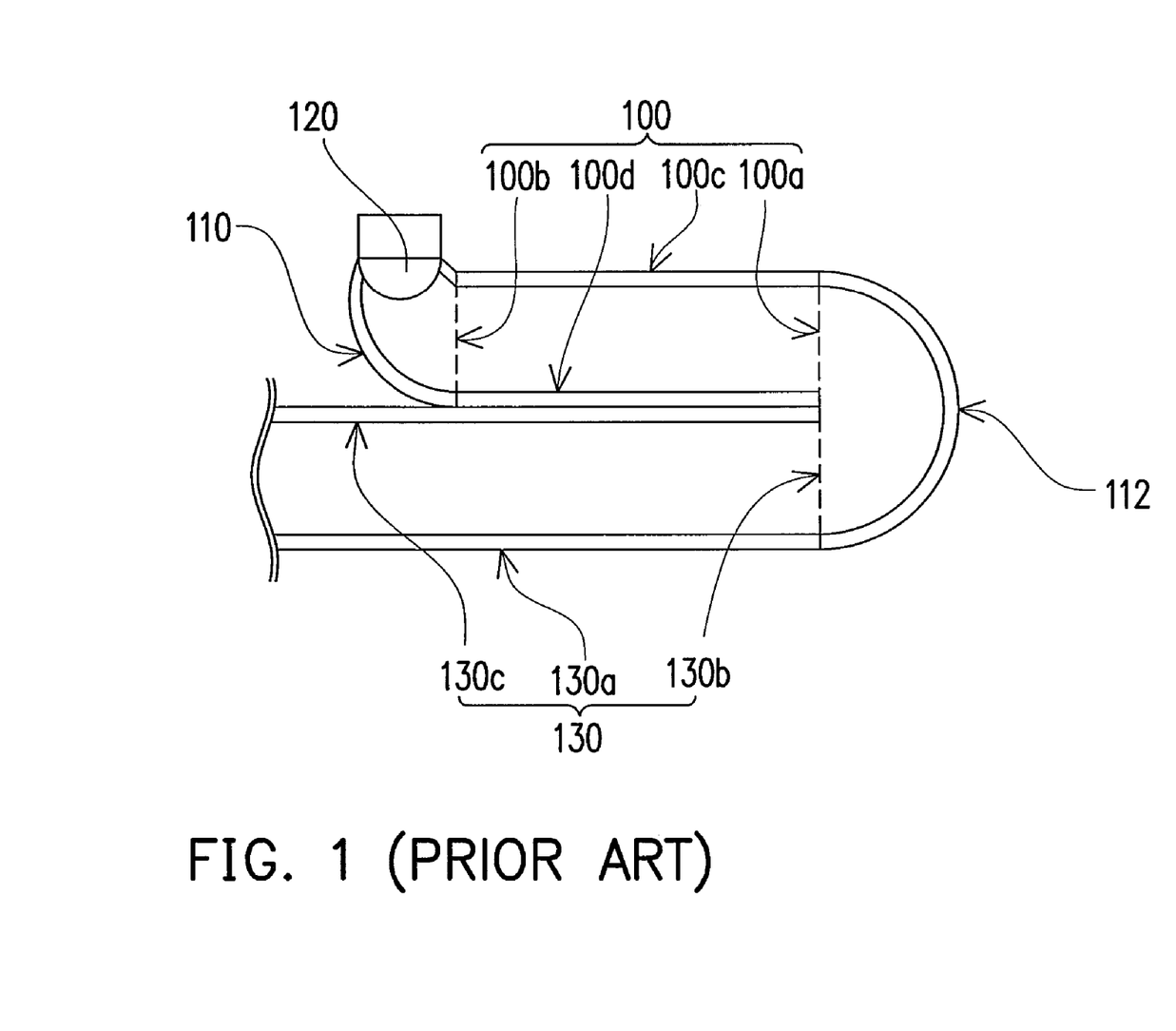
FIG. 1 is a schematic view of a conventional side light type backlight module.

FIG. 1 is a schematic view of a conventional side light type backlight module. Referring to FIG. 1, the conventional side light type backlight module includes a first light guide plate 100, two reflectors 110 and 112, a point light source 120 and a second light guide plate 130. The first light guide plate 100 has a light emitting surface 100a, a light incident surface 100b, a top surface 100c and a bottom surface 100d. The second light guide plate 130 has a light emitting surface 130a, a light incident surface 130b and a bottom surface 130c. In addition, the bottom surface 100d of the first light guide plate 100 is connected to the bottom surface 130c of the second light guide plate 130. The reflector 112 connects the light emitting surface 100a of the first light guide plate 100 and the light incident surface 130b of the second light guide plate 130. The reflector 110 connects the point light source 120 and the light incident surface 100b of the first light guide plate 100. As shown in FIG. 1, in order to obtain a uniform white light, the conventional backlight module adds the first light guide plate 100 to increase the light-mixing distance. However, the above architecture increases the overall thickness of the backlight module, thus deviating from the current appearance design trend of the lighter and thinner display.

SUMMARY OF THE INVENTION

An objective of the present invention is to provide a backlight module, for obtaining a white light of high saturation.

In order to achieve the above or other objectives, the present invention provides a backlight module, which comprises a light guide plate, a plurality of reflectors and a plurality of point light sources. The light guide plate has a light emitting surface, a bottom surface and a light incident surface connecting the light emitting surface and the bottom surface. The reflectors are disposed beside the light incident surface. The point light sources are disposed on the inner walls of the reflectors.

In an embodiment of the present invention, the reflector comprises a bottom part and a circular side wall. The circular side wall is connected to the bottom part, and the point light sources are disposed on the circular side wall.

In an embodiment of the present invention, the reflector comprises a bottom part, a circular side wall and a top part. The circular side wall is connected to the bottom part. The top part is connected to the circular side wall and has an opening facing the light incident surface. Moreover, the point light sources are disposed on the top part.

In an embodiment of the present invention, the point light sources in each of the reflectors comprise a red point light source, a green point light source and a blue point light source.

In an embodiment of the present invention, the point light sources in each of the reflectors comprise a plurality of red point light sources, a plurality of green point light sources and a plurality of blue point light sources.

In an embodiment of the present invention, the point light sources in each of the reflectors comprise a plurality of white point light sources.

In an embodiment of the present invention, the white point light source comprise a red point light source, a green point light source and a blue point light source.

In an embodiment of the present invention, the backlight module further comprises a back plate and the light guide plate is disposed thereon.

In an embodiment of the present invention, the backlight module further comprises a plastic frame disposed on the back plate and located above the light guide plate.

In an embodiment of the present invention, the backlight module further comprises a circuit board and the reflectors are disposed on the circuit board.

In an embodiment of the present invention, the backlight module further comprises a reflective film disposed on the bottom surface of the light guide plate.

In an embodiment of the present invention, the backlight module further comprises at least one optical film disposed on the light emitting surface of the light guide plate.

In order to achieve the above or other objectives, the present invention further provides a backlight module, which comprises a back plate, a plurality of reflectors and a plurality of point light sources. The reflectors are disposed in the back plate. The plurality of point light sources is disposed on the inner walls of the reflectors.

In an embodiment of the present invention, the reflector comprises a bottom part and a circular side wall, wherein the circular side wall is connected to the bottom part, and the point light sources are disposed on the circular side wall.

In an embodiment of the present invention, the above reflector comprises a bottom part, a circular side wall and a top part. The circular side wall is connected to the bottom part. The top part is connected to the circular side wall and has an opening for exposing a portion of the bottom part. Moreover, the point light sources are disposed on the top part.

In an embodiment of the present invention, the point light sources in each of the reflectors comprise a red point light source, a green point light source and a blue point light source.

In an embodiment of the present invention, the point light sources in each of the reflectors comprise a plurality of red point light sources, a plurality of green point light sources and a plurality of blue point light sources.

In an embodiment of the present invention, the point light sources in each of the reflectors comprise a plurality of white point light sources.

In an embodiment of the present invention, the white point light source comprise a red point light source, a green point light source and a blue point light source.

In an embodiment of the present invention, the backlight module further comprises at least one optical film disposed on the back plate and located above the reflectors.

For the backlight module of the present invention, the point light sources are disposed in the reflectors for obtaining a white light by mixing. Therefore, the backlight module of the present invention is thinner compared with the conventional art.

In order to make the above and other objectives, features and advantages of the present invention comprehensible, preferred embodiments accompanied with figures are described in detail below.

DESCRIPTION OF EMBODIMENTS

The First Embodiment

Figure 2A:
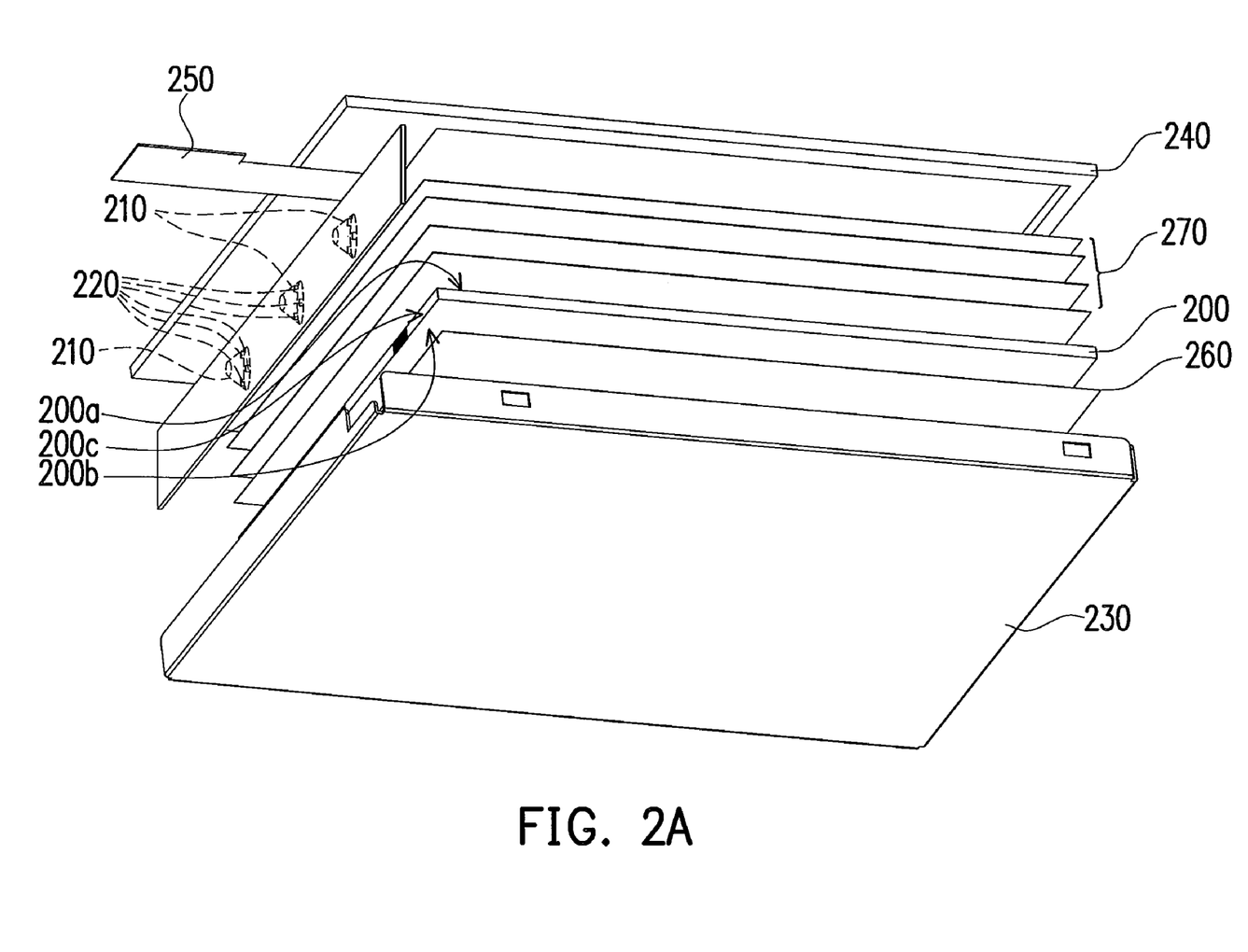
FIG. 2A is a schematic view of the backlight module according to the first embodiment of the present invention.
Figure 2B:
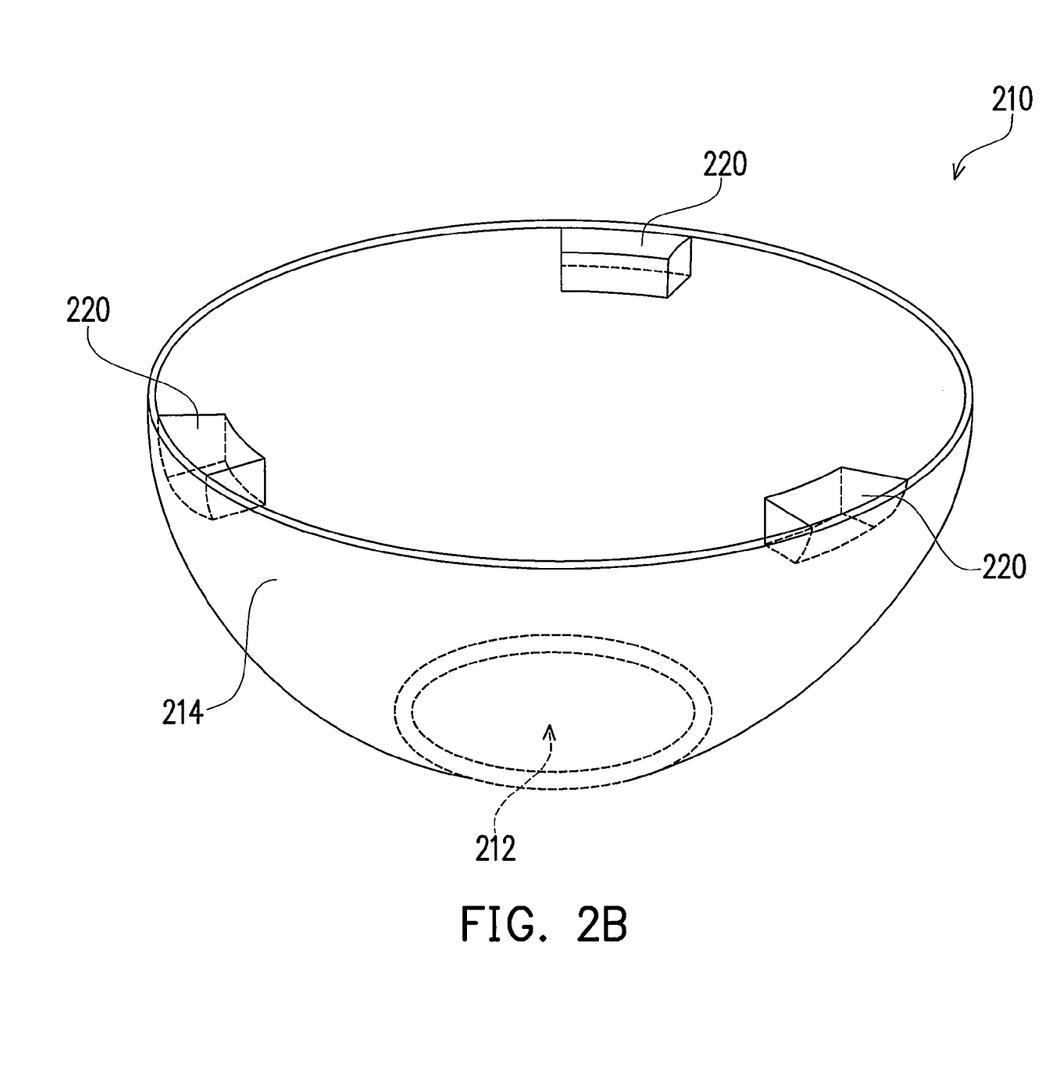
FIG. 2B is a schematic view of the reflector in FIG. 2A.

FIG. 2A is a schematic view of the backlight module according to the first embodiment of the present invention. FIG. 2B is a schematic view of the reflector in FIG. 2A. Referring to FIG. 2A, the backlight module of the present embodiment comprises a light guide plate 200, a plurality of reflectors 210 and a plurality of point light sources 220. The light guide plate 200 has a light emitting surface 200a, a bottom surface 200b and a light incident surface 200c connecting the light emitting surface 200a and the bottom surface 200b. In addition, the reflectors 210 are disposed beside the light incident surface 200c, and the point light sources 220 are disposed on the inner walls of the reflectors 210. In other words, the backlight module of the present embodiment is a side light type backlight module.

Referring to FIG. 2B, more particularly, the reflector 210 of the present embodiment includes a bottom part 212 and a circular side wall 214. The circular side wall 214 is connected with the bottom part 212, and the point light sources 220 are disposed on the circular side wall 214. Moreover, the material of the reflector 210 is, for example, metal.

In the present embodiment, the above point light sources 220 in each of the reflectors 210 are a red point light source, a green point light source and a blue point light source. In another embodiment, the above point light sources 220 in each of the reflectors 210 are red point light sources, green point light sources and blue point light sources. Of course, in another embodiment, the point light sources 220 can also be white point light sources or each white point light source consisted of a red point light source, a green point light source and a blue point light source. Additionally, in the present embodiment, the adopted point light sources are LEDs, and in another embodiment, organic light-emitting diodes (OLEDs) can also be used.

Continue referring to FIG. 2A, in the present embodiment, the backlight module further comprises a back plate 230, a plastic frame 240, a circuit board 250, a reflective film 260 and at least one optical film 270. The light guide plate 200 is disposed on the back plate 230. The plastic frame 240 is disposed on the back plate 230 and located above the light guide plate 200. The reflectors 210 are disposed on the circuit board 250, and the reflective film 260 is disposed on the bottom surface 200b of the light guide plate 200. In addition, the optical film 270 is disposed on the light emitting surface 200a of the light guide plate 200.

In the present embodiment, red, blue and green point light sources are disposed in the reflectors 210 and mixed to obtain a white light, thus the backlight module of the present embodiment is thinner compared with the conventional art. Besides, as the white light provided by the backlight module of the present embodiment is obtained by mixing the red, blue and green lights, the display adopting the backlight module of the present embodiment has a preferable display quality.

The Second Embodiment

Figure 3:
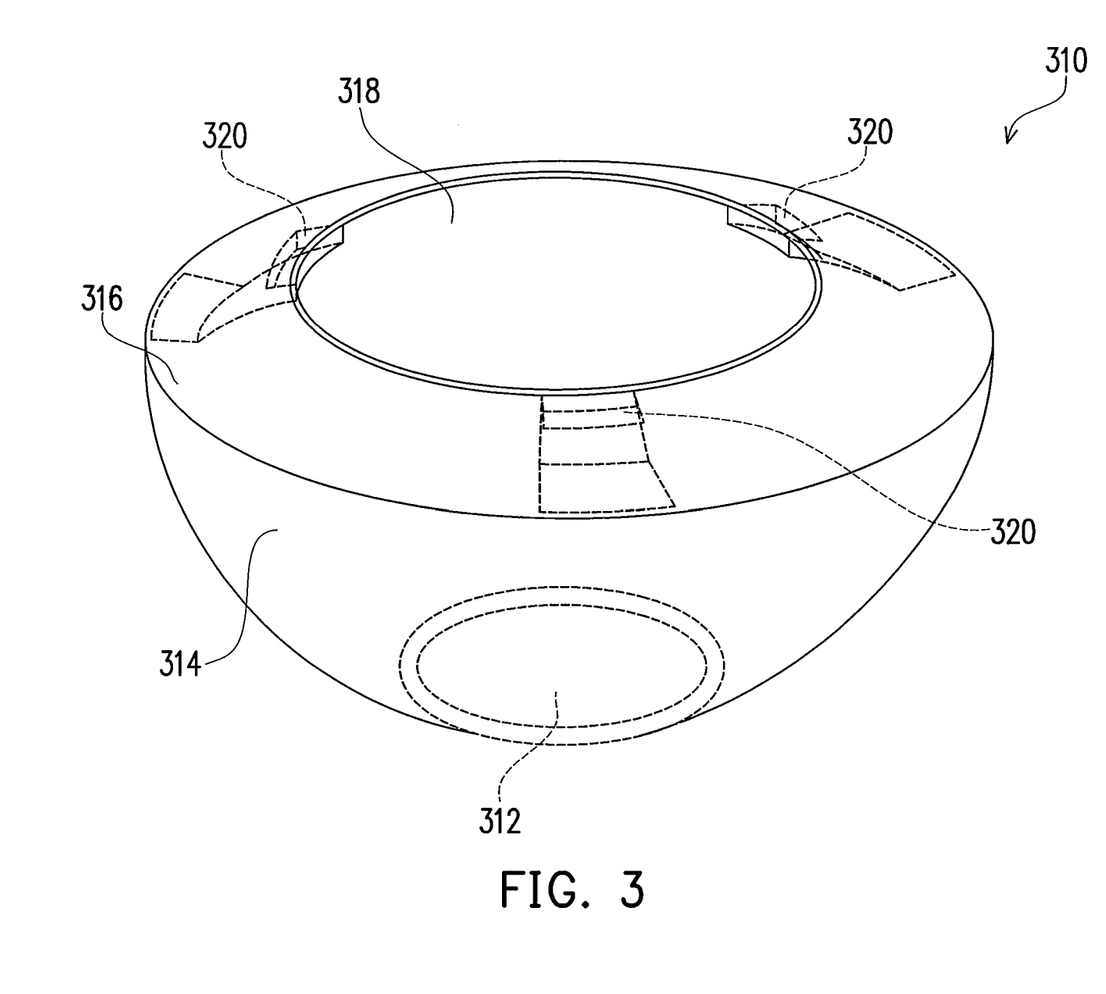
FIG. 3 is a schematic view of the reflector according to the second embodiment of the present invention.

The architecture of a backlight module of the present embodiment is substantially the same as that of the above-mentioned back light module, only except the structure of the reflector 310.

FIG. 3 is a schematic view of the reflector according to the second embodiment of the present invention. Referring to FIG. 3, the reflector 310 in the present embodiment includes a bottom part 312, a circular side wall 314 and a top part 316. The circular side wall 314 is connected with the bottom part 312, and the top part 316 is connected with the circular side wall 314. Additionally, the top part 316 has an opening 318 for exposing a portion of the bottom part 312. Further, a plurality of point light sources 320 is disposed on the top part 316.

In the present embodiment, as the point light sources 320 are disposed on the top part 316 of the reflector 310 and mixed to obtain a uniform white light, the backlight module adopting the reflector 310 is thinner compared with the conventional art.

The Third Embodiment

Figure 4A:
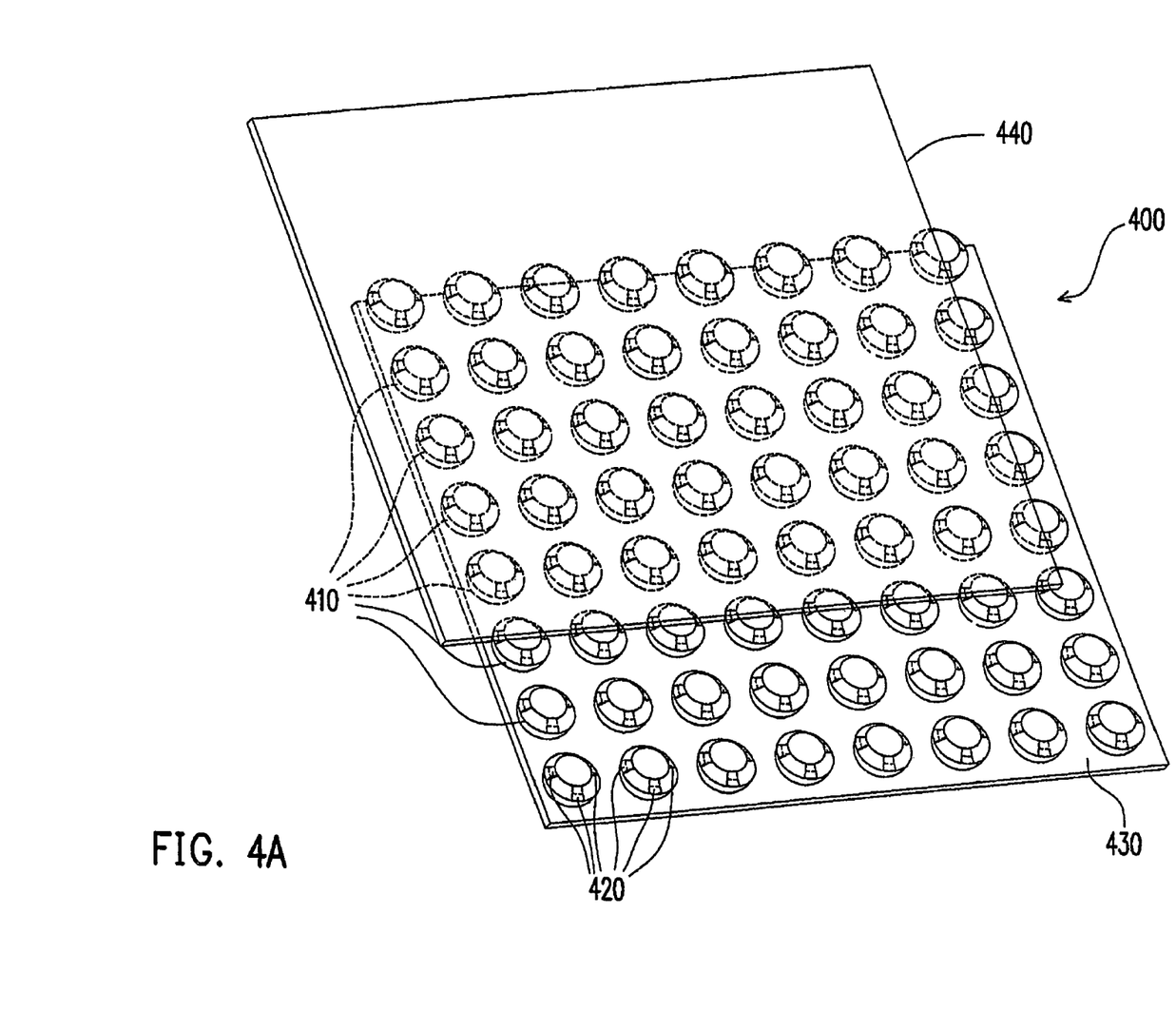
FIG. 4A is a schematic view of the backlight module according to the third embodiment of the present invention.
Figure 4B:
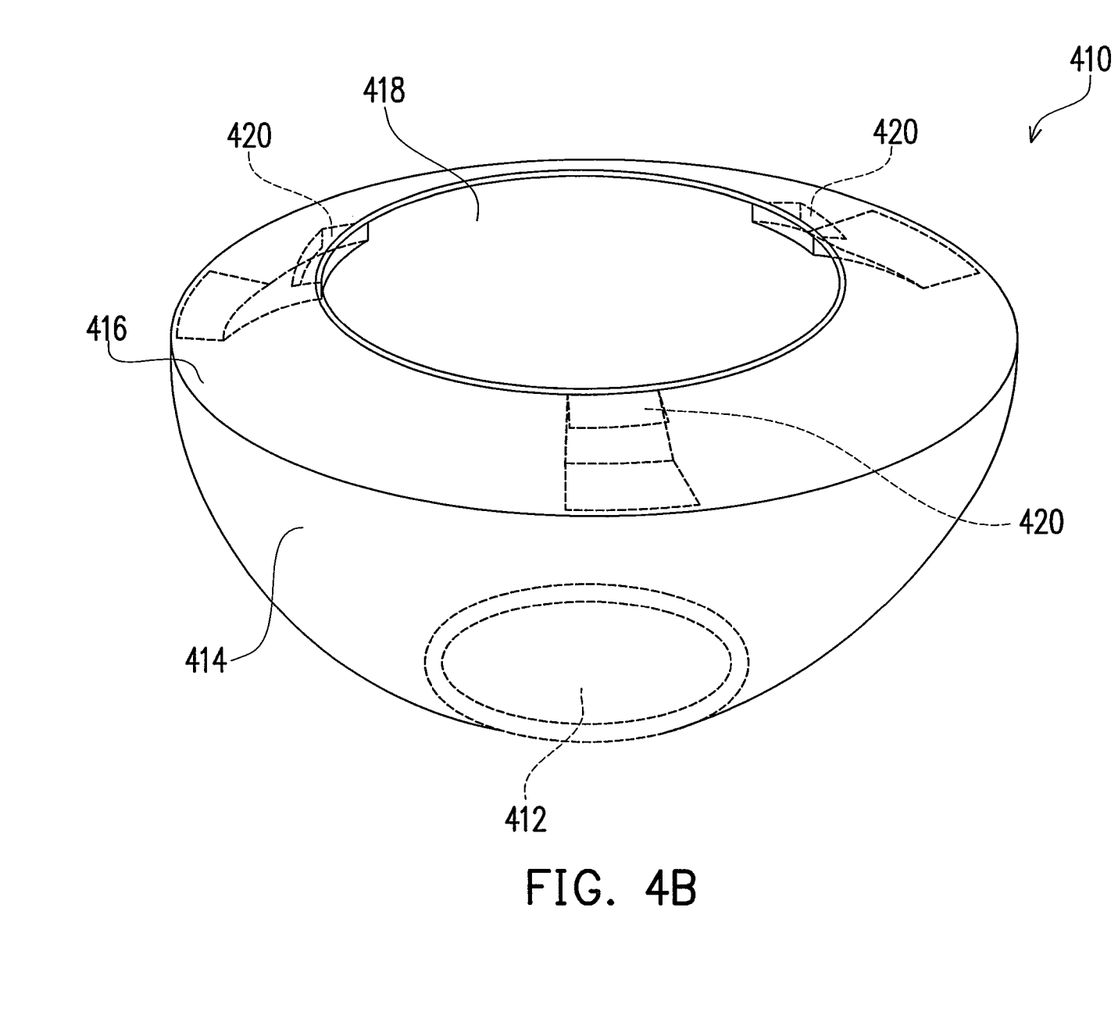
FIG. 4B is a schematic enlarged view of the reflector in FIG. 4A.

FIG. 4A is a schematic view of the backlight module according to the third embodiment of the present invention. FIG. 4B is a schematic enlarged view of the reflector in FIG. 4A. Referring to FIG. 4A, a backlight module 400 comprises a plurality of reflectors 410, a plurality of point light sources 420 and a back plate 430, wherein the reflectors 410 are disposed on the back plate 430, and each of the reflectors 410 is provided with a plurality of point light sources 420. In brief, the backlight module 400 of the present embodiment is a direct type backlight module. Furthermore, the optical film 440 is disposed on the back plate 430 and located above the reflectors 410.

Referring to FIG. 4B, more particularly, the reflector 410 of the present embodiment includes a bottom part 412, a circular side wall 414 and a top part 416. The circular side wall 414 is connected with the bottom part 412, and the top part 416 is connected with the circular side wall 414. In addition, the top part has an opening 418 for exposing a portion of the bottom part 412. Further, the point light sources 420 are disposed on the top part 416.

In the present embodiment, the structure of the reflector 410 is identical to that of the reflector 310 in the above embodiment. However, the aforementioned reflector 210 can also be applied to the present embodiment, which will not be described in detail herein. Further, as the reflectors 410 are directly disposed on the back plate 430 of the backlight module 400, the heat generated by the point light sources 430 disposed in the reflector 410 can be directly dissipated to the outside via the back plate 430 of the backlight module 400, thereby enhancing the heat dissipation effect.

In view of the above, in the present invention, the point light sources are disposed in the reflectors and mixed to obtain a white light of high saturation. Therefore, compared with the conventional architecture of additionally adding the light guide plate to prolong the light-mixing distance, the backlight module of the present invention is thinner, thus being compliant to the current trend of the lighter and thinner display.

Moreover, the reflectors of the present invention can be applied to a side light type or a direct type backlight module, and some means of the backlight module can be omitted, thus reducing the cost of the backlight module. Additionally, when the reflectors are applied to a direct type backlight module, the heat generated by the point light sources can be transferred to the back plate of the backlight module via the reflectors, so as to enhance the heat dissipation effect and thus prolong the service life.

Though the present invention has been disclosed above by the preferred embodiments, they are not intended to limit the present invention. Anybody skilled in the art can make some modifications and variations without departing from the spirit and scope of the present invention. Therefore, the protecting range of the present invention falls in the appended claims.

What is claimed is:

1. A backlight module, comprising:
a light guide plate, having a light emitting surface, a bottom surface and a light incident surface connecting the light emitting surface and the bottom surface;
a plurality of reflectors, disposed beside the light incident surface, each of the reflectors comprising:
a bottom part; a circular side wall connected with the bottom part; a top part connected with the circular side wall wherein the top part comprises a surface which extends from the circular side wall and is approximately parallel to and faces the bottom part wherein the surface forms an opening which faces the light incident surface wherein the top part is closer to the light incident surface than the bottom part; and
a plurality of point light sources, disposed on the surface of each of the reflectors.

2. The backlight module according to claim 1, wherein the point light sources in each of the reflectors comprise a red point light source, a green point light source and a blue point light source.

3. The backlight module according to claim 1, wherein the point light sources in each of the reflectors comprise a plurality of red point light sources, a plurality of green point light sources and a plurality of blue point light sources.

4. The backlight module according to claim 1, wherein the point light sources in each of the reflectors comprise a plurality of white point light sources.

5. The backlight module according to claim 4, wherein the white point light source comprise a red point light source, a green point light source and a blue point light source.

6. The backlight module according to claim 1, further comprising a back plate, wherein the light guide plate is disposed on the back plate.

7. The backlight module according to claim 6, further comprising a plastic frame disposed on the back plate and located above the light guide plate.

8. The backlight module according to claim 1, further comprising a circuit board, wherein the reflectors are disposed on the circuit board.

9. The backlight module according to claim 1, further comprising a reflective film disposed on the bottom surface of the light guide plate.

10. The backlight module according to claim 1, further comprising at least one optical film disposed on the light emitting surface of the light guide plate.

11. A backlight module, comprising:
a light guide plate, having a light emitting surface, a bottom surface and a light incident surface connecting the light emitting surface and the bottom surface;
a plurality of reflectors, disposed beside the bottom surface, each of the reflectors comprising:
a bottom part; a circular side wall, connected with the bottom part;
a top part, the circular side wall is connected between the top part and the bottom part, the top part comprises a surface which extends from the circular side wall and is approximately parallel to and faces the bottom part wherein the surface forms an opening which faces the bottom surface wherein the top part is closer to the bottom surface of the light guide plate than bottom part of each of the reflectors; and
a plurality of point light sources, disposed on the surface of each of the reflectors.

12. The backlight module according to claim 11, wherein the point light sources in each of the reflectors comprise a red point light source, a green point light source and a blue point light source.

13. The backlight module according to claim 11, wherein the point light source in each of the reflectors comprise a plurality of red point light source, a plurality of green point light sources and a plurality of blue point light source.

14. The backlight module according to claim 11, wherein the point light source in each of the reflectors comprise a plurality of white point light sources.

15. The backlight module according to claim 14, wherein the white point light sources comprise a point light source, a green point light source and a blue point light source.

16. The backlight module according to claim 11, further comprising a back plate, wherein the light guide plate is disposed on the back plate.

17. The backlight module according to claim 16, further comprising a plastic frame disposed on the back plate and located above the light guide plate.

18. The backlight module according to claim 11, further comprising a circuit board, wherein the reflectors are disposed on the circuit board.

19. The backlight module according to claim 11, further comprising a reflective film disposed on the bottom surface of the light guide plate.

20. The backlight module according to claim 11, further comprising at least one optical film disposed on the light emitting surface of the light guide plate.

21. A backlight module, comprising: a back plate; a plurality of reflectors, disposed on the back plate, each of the reflectors comprising: a bottom part; a circular side wall, connected with the bottom part; a top, the circular side wall is connected between the top part and the bottom part the top part comprises a surface which extends from the circular side wall that is approximately parallel to and faces the bottom part wherein the surface forms an opening; a plurality of point light source disposed on the surface of each of the reflectors; and
an optical film, disposed on the back plate and located above the reflectors, wherein the top part is located between the optical film and the bottom part wherein the opening faces the optical film.

22. The backlight module according to claim 21, wherein the point light sources in each of the reflectors comprise a red point light source, a green point light source and a blue point light source.

23. The backlight module according to claim 21, wherein the point light sources in each of the reflectors comprise a plurality of red point light sources, a plurality of green point light sources and a plurality of blue point light sources.

24. The backlight module according to claim 21, wherein the point light sources comprise a plurality of white point light sources.

25. The backlight module according to claim 24, wherein the white point light source comprise a red point light source, a green point light source and a blue point light source.

* * * * *